(12) United States Patent
Khare et al.

(10) Patent No.: US 6,432,873 B1
(45) Date of Patent: Aug. 13, 2002

(54) SULFUR ABSORBENTS

(76) Inventors: Gyanesh P. Khare; Ralph E. Bonnell, both of Richmond, Phillips, Hitchcock & Fish P.O. Box 2443, Bartlesville, OK (US) 74005

(*) Notice: Subject to any disclaimer, the term of this patent is extended or adjusted under 35 U.S.C. 154(b) by 0 days.

(21) Appl. No.: 09/047,677

(22) Filed: Mar. 25, 1998

Related U.S. Application Data (62) Division of application No. 08/694,975, filed on Aug. 9, 1996, now Pat. No. 5,780,001, which is a continuation of application No. 07/826,567, filed on Jan. 27, 1992, now abandoned.

(51) Int. Cl.$^7$ ................................................ B01J 20/02
(52) U.S. Cl. ........................ 502/406; 502/407; 502/415
(58) Field of Search ............................... 502/400, 406, 502/407, 415, 343, 250, 325, 337

*Primary Examiner*—Steven P. Griffin
*Assistant Examiner*—Edward M. Johnson
(74) *Attorney, Agent, or Firm*—Richmond, Hitchcock, Fish & Dollar (57) ABSTRACT

A composition and method of making a strength enhanced composition are described. The composition comprises zinc oxide, silica and colloidal oxide solution. The colloidal oxide solution is utilized as a binding agent to provide a strength enhanced absorbent composition that can be utilized in an absorption process for the purpose of removing sulfur contaminants from fluid streams.

14 Claims, 2 Drawing Sheets

SULFUR ABSORBENTS

This application is a division of application Ser. No. 08/694,975, filed on Aug. 9, 1996, now U.S. Pat. No. 5,780,001, which is a continuation of application Ser. No. 07/826,567 filed on Jan. 27, 1992, now abandoned.

This invention relates to sulfur-absorbent compositions, the manufacture of sulfur absorbents and their use.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

Various absorption compositions have been used to remove sulfur from fluid streams when the sulfur is present as hydrogen sulfide. These absorption compositions can be manufactured by a variety of methods which include, for example, extrusion production techniques. A problem that is often encountered in the production of these absorption compositions is equipment wear caused by the abrasive nature of the absorption materials being manufactured. In certain attempts to produce commercial quantities of absorbent compositions, excessive equipment wear and downtime caused by the abrasive characteristics of the absorption material components have, in effect, rendered the production commercially unviable.

It is desirable for an absorbent composition to not only have a high sulfur-absorption capacity but also to have sufficient mechanical strength to permit its use as a contact material that is placed as an absorbent bed within a contact vessel. A low mechanical strength or low crush strength of an absorbent agglomerate can lead to excessive attrition thereby causing undesirable operating difficulties in commercial processes which utilize such absorbent agglomerates.

A further property of which it is desirable for absorption compositions to have is the ability to absorb large quantities of sulfur. This capability to absorb large amounts and maintain high concentrations of sulfur is sometimes referred to as "sulfur loading" and is generally reported in terms of percent sulfur loading. The term "percent sulfur loading" is generally defined as the parts by weight of sulfur absorbed upon the surface or within the pores of an absorption composition per parts by weight of the total absorbent composition multiplied by a factor of 100. It is desirable to have an absorption composition with the largest possible sulfur loading capacity.

An additional property desirable for an absorption composition is the ability to be regenerated to its original absorbing composition state after the absorbing composition has become spent. An absorbing composition generally becomes spent when its sulfur loading capacity has essentially been used up. It is desirable for the absorbing composition to be able to undergo numerous regeneration cycles without losing its sulfur loading capacity and other desirable properties.

Even though many absorbing compositions can effectively absorb hydrogen sulfide from fluid streams containing hydrogen sulfide, it is not uncommon for many of these absorbing compositions to effectively oxidize significant amounts of hydrogen sulfide to sulfur dioxide when contacted with such fluid streams. The resulting sulfur dioxide is not removed from the fluid stream by the absorbent composition and thus passes through the absorbent material with the contacted fluid stream. This phenomena is sometimes called "sulfur slippage". It is desirable to have an absorption material that has a high capacity to absorb sulfur from a fluid stream but which minimizes the amount of sulfur slippage.

In some absorption compositions, the addition of a promoter compound can be used to allow for easier regeneration of the absorbing material.

It is, thus, an object of the present invention to provide an improved absorption composition capable of removing certain sulfur compounds from fluid streams.

Another object of this invention is to provide an absorption process for the removal of sulfur from fluid streams.

Yet another object of the present invention is to provide an absorption composition characterized by exceptional mechanical strength and an improved process for the production of such composition.

A still further object of this invention is to provide a method of manufacturing an absorption composition that minimizes equipment wear and that produces an absorption composition having a high mechanical strength.

In accordance with one aspect of this invention, there is provided a composition comprising zinc oxide, silica and a colloidal oxide solution. In accordance with another aspect of this invention, there is provided a method for preparing a high crush strength absorption composition comprising the step of spraying a colloidal oxide solution onto a homogeneous mixture comprising zinc oxide and silica during tumbling agglomeration to form an agglomerate. Another aspect of the present invention includes an absorption process wherein a fluid stream is contacted under absorption conditions with an absorption composition comprising zinc oxide, silica and a colloidal oxide solution.

Other objects, advantages and features of this invention will become apparent from a study of this disclosure, the appended claims and the drawings in which:

The composition of matter of the present invention can suitably comprise, consist of, or consist essentially of, zinc oxide, silica and colloidal oxide solution. It has been found that an absorption composition having certain exceptional physical properties can be produced when a colloidal oxide solution is utilized in the production of the absorption composition or absorption material. In particular, the absorption composition can have improved mechanical strength, or crush strength, by the utilization of a colloidal oxide solution when the material is manufactured. A further advantage from the utilization of a colloidal oxide solution as a component of the composition of matter of this invention is that it permits the use of tumbling agglomeration techniques in the production of an agglomerate, rather than the use of extrusion techniques, to agglomerate the material components of the composition of matter of this invention. Experience has demonstrated that the use of silica compounds as a component of absorbent compositions causes excessive equipment wear when agglomerates are formed by use of extrusion equipment. The excessive equipment wear that results from the abrasive characteristics of silica components of the agglomerate materials has rendered the production of such absorbent agglomerates commercially unviable. The use of a colloidal oxide solution as a binder material in the manufacture of the absorbent composition permits the production of the agglomerates by use of tumbling agglomeration techniques, while at the same time, it provides the unexpected result of producing an agglomerate material that has a higher crush strength than an agglomerate produced by extrusion agglomeration techniques.

In another embodiment of this invention, there is provided a composition suitably comprising, consisting of, or consisting essentially of zinc oxide, silica and colloidal oxide solution wherein the ratio of zinc oxide to silica in the composition is in the range of from about 0.25 to 1 (0.25:1) to about 4 to 1 (4:1). Preferably, the ratio of zinc oxide to silica in the composition of matter of this invention can be in the range of from about 0.5 to 1 (0.5:1) to about 1.5 to 1 (1.5:1); but, most preferably, the ratio of zinc oxide to silica should range from 0.75 to 1 (0.75:1) to 1.25 to 1 (1.25:1).

The colloidal oxide solution component of the composition of matter described herein should be present in an amount which is effective for providing sufficient binding properties to give a final agglomerate of the components of the composition of this invention, which has been dried or calcined, or both, having a crush strength of at least about 3 lbs force ($lb_f$). The final agglomerate can preferably have a crush strength in the range of from about 3 $lb_f$ to about 6 $lb_f$; but, most preferably, the crush strength can range from 3.5 $lb_f$ to 5.5 $lb_f$. The term "crush strength" as used herein when referring to the mechanical properties of the absorbent agglomerates is that which is determined by standard ASTM method, D4179-88A, entitled "Standard Test Method For Single Pellet Crush Strength of Formed Catalyst Spheres". The Standard Test Method ASTM D4179-88A is incorporated herein by reference.

Alternatively, it is desirable for the amount of colloidal oxide solution component of the composition of the invention to he such that the metal oxide compound content of the composition is in the range of from an amount effective for providing an agglomerate of said composition having a crush strength at least about 3 $lb_f$ to about 30 weight percent of the total weight of said composition. Preferably, however, the amount of colloidal oxide solution component of the composition of matter of this invention is such that the metal oxide compound content is in the range of from about 5 weight percent to about 20 weight percent; but, most preferably, the metal oxide content shall range from 5 weight percent to 15 weight percent.

The composition comprising, consisting of, or consisting essentially of, zinc oxide, silica and colloidal oxide solution can additionally be dried to form a dried agglomerate or calcined to form a calcined agglomerate or alternatively, both dried and calcined. The drying step is used generally to remove the liquid medium of the colloidal oxide solution from the composition of matter of this invention. The drying of the composition can be conducted at any suitable temperature for removing the liquid medium of the colloidal oxide solution; but, preferably, the drying step should be conducted in the range of from about 150° F. to about 550° F. More preferably, however, the drying step shall range from about 190° F. to about 480° F. Generally, the time period for such drying shall range from about 0.5 hour to about 4 hours, and more preferably, the drying time shall range from about 1 hour to about 3 hours.

The composition comprising, consisting of, or consisting essentially of, zinc oxide, silica and colloidal oxide solution can be calcined, after undergoing a drying step, to form a calcined agglomerate. The calcination of the composition or agglomerate can be conducted under any suitable calcination conditions; but, preferably, the composition shall be calcined in the presence of either oxygen or an oxygen-containing fluid at a temperature suitable for achieving the desired degree of calcination. Generally, the temperature shall range from about 700° F. to about 1400° F.; and, more preferably, the calcination temperature shall range from about 900° F. to about 1300° F. The calcining step can be conducted for a period of time suitable for achieving the desired degree of calcination, but generally, the time for calcination shall range from about 0.5 hours to about 4 hours. Most preferably, the calcination time shall range from about 1 hour to about 3 hours to produce a calcined absorbing composition.

It can further be desirable to add a Group VIII metal oxide promoter to the composition comprising, consisting of, or consisting essentially of, zinc oxide, silica and colloidal oxide solution, which has previously been either dried or calcined, or both, to produce the aforementioned dried agglomerate or calcined agglomerate. It has been found that the addition of certain metal promoters provide certain improved physical and chemical properties to the absorbent composition. These improved properties include, for example, the ability of the composition to hydrogenate sulfur oxide species to hydrogen sulfide and an improved ability of the absorbent composition to easily be regenerated after becoming spent. A further improvement to the composition resulting from the addition of metal promoters is in the mechanical strength of the composition once it has been promoted and subsequently dried, or calcined, or both. By incorporating a metal oxide promoter into the composition of matter described herein followed by drying and/or calcining the material, the resultant agglomerate will have an improved mechanical strength or crush strength of at least about 5 $lbs_f$. Preferably, however, the crush strength of the promoted composition shall range from about 6 $lbs_f$ to about 14 $lbs_f$, and most preferably, the crush strength shall range from about 7 $lbs_f$ to about 13 $lbs_f$.

An alternative composition of matter of this invention includes a composition comprising a mixture comprising, consisting of, or consisting essentially of, zinc oxide, silica and colloidal oxide solution that has undergone a drying step or a calcining step, or both. The drying of the mixture results in removing from the composition or mixture, the liquid medium of the colloidal oxide solution to thereby form a dried mixture; or in the case where the composition is either both dried and calcined or merely calcined, the calcining of the composition or mixture suitably provides a calcined agglomerate. The dried mixture or the calcined agglomerate can optionally be impregnated with a metal oxide promoter for the purposes of improving performance of the composition as an absorbent and for improving crush strength of the composition by producing a promoted calcined mixture. The metal oxide promoted composition, having undergone a further calcining step, can have a crush strength of at least about 5 $lbs_f$. Preferably, the crush strength of the metal oxide promoted absorbent composition, which has been calcined, can range from about 6 $lbs_f$ to about 14 $lbs_f$, most preferably, however, the crush strength shall range from 7 $lbs_f$ to 13 $lbs_f$.

As for the amount of colloidal oxide solution utilized in the mixture comprising, consisting of, or consisting essentially of zinc oxide, silica and colloidal solution, it is such that the amount of metal oxide compound present in the dried mixture will preferably range from about 1 weight percent to about 30 weight percent of the total weight of the dried mixture. Preferably, however, the amount of colloidal oxide solution utilized in the the mixture should be such that the metal oxide content of the dried mixture shall range from about 5 weight percent to about 20 weight percent. Most preferably, the quantity of colloidal oxide solution present in the mixture of this invention will be such that the amount of metal oxide content in the final dried mixture shall range from 5 weight percent to 15 weight percent.

The ratio of zinc oxide to silica in the mixture of the absorption composition can be in the range of from about 0.25 to 1 (0.25:1) to about 4 to 1 (4:1). Preferably, the ratio of zinc oxide to silica in the mixture of the absorption composition can range from about 0.5 to 1 (0.5:1) to about 1.5 to 1 (1.5:1); but, most preferably, the ratio of zinc oxide to silica in the mixture of the absorption composition can range from 0.75 to 1 (0.75:1) to about 1.25 to 1 (1.25:1).

The silica component of the compositions described herein can be any suitable form of silica, including, but not limited to, naturally occurring silica, such as a diatomaceous earth, which is also called kieselguhr or diatomite or celite, and synthetic silica, such as zeolites, high silica zeolites, precipitated or spray dried silicas or clay and plasma-treated silica or clay. Furthermore, the silica can be in the form of one or more silica compounds that are convertible to silica under the conditions of absorption composition preparation described herein. Examples of other suitable types of silica that can be used include diatomite, silicate, silica colloid, flame hydrolyzed silica, hydrolyzed silica, and precipitated silica. Examples of silicon compounds that are convertible to silica under the production conditions used in the preparation of the absorption composition described herein include, silicic acid, sodium silicate, and ammonium silicate.

Generally, zinc oxide is the primary active component of the compositions of the invention, and the zinc oxide will be present in the compositions in an amount suitable for providing the desired absorption capacity. The zinc oxide component of the absorption composition can be either in the form of zinc oxide or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, zinc oxide is in the form of a powdered zinc oxide.

The colloidal oxide solution component of the compositions of matter described herein is generally a chemical sol comprising a metal oxide compound or material contained in a solution or a liquid medium. It is preferred that the colloidal oxide solution comprise finely divided, colloidal-size particles of a metal oxide compound that is uniformly dispersed in a liquid medium. The finely divided particles are not necessarily in the molecular state, but they are generally polymolecular particles having a size of which 99 percent of such particles will be in the size range of from about 10 angstroms to about 10,000 angstroms. It is generally preferred, however, that 99 percent of the particles have a size in the range of from about 50 angstroms to about 10,000 angstroms; and, most preferably, 99 percent of the particles shall have a size in the range of from 50 angstroms to 5,000 angstroms. As for the medium particle size of the colloidal oxide compounds, it is desirable to have a medium size in the range of from about 50 angstroms to about 10,000 angstroms. Preferably, the medium particle size should range from about 10 angstroms to about 1000 angstroms, and most preferably, the medium particle size can range from 100 angstroms to 500 angstroms.

Typical solid concentrations in a colloidal oxide solution can range from about 1 weight percent to about 30 weight percent solids, with the weight percent of solids being defined as a fraction of the weight of solids to the total weight of the colloidal oxide solution multiplied by a factor of 100. The solution pH can range from about 2 to about 11 depending upon the method of preparation of the colloidal oxide solution. It is preferred that the invention use a colloidal oxide solution comprising a metal oxide selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide and mixtures of any two or more thereof. It is presently preferred that the colloidal oxide solution be one of either a colloidal alumina solution or a colloidal silica solution or some mixture thereof. The solvent or liquid medium is preferably water which serves as an aqueous solvent.

The compositions described herein can optionally be promoted with any suitable metal oxide promoter. Examples of such suitable metal oxide promoters include the oxides of manganese, rhenium, copper, molybdenum, tungsten, Group VIII metals of the Periodic Table, and any other metal oxide that is known to have hydrogenation ability of the type necessary to reduce sulfur oxide species to hydrogen sulfide. Preferably, the metal oxide promoter is a Group VIII metal oxide promoter with the Group VIII metal being from the group consisting of iron, cobalt, nickel, ruthenium, rhodium, palladium, osmium, iridium and platinum. In the most preferred embodiment of the present invention, the absorbing composition is promoted with nickel oxide.

The metal oxide promoter can be added to the absorbing composition in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates and mixtures of any two or more thereof.

The elemental metal, metal oxide, and/or metal-containing compounds can be added to the absorbing composition by any method known in the art. One such method is the impregnation of the absorbing composition with a solution, either aqueous or organic, that contains the elemental metal, metal oxide, and/or metal-containing compounds. After the elemental metal, metal oxide, and/or metal-containing compounds have been added to the absorbing composition, the promoted composition is dried and calcined, as described hereinafter.

The elemental metal, metal oxide, and/or metal-containing compounds can be added to the absorbing composition as components of the original mixture, or they can be added after the absorbing composition has been dried and calcined. If the metal oxide promoter is added to the absorbing composition after it has been dried and calcined, then the now-promoted composition is dried and calcined a second time to form the promoted absorbing composition. The now-promoted composition is preferably dried at a temperature in the range of about 150° F. to about 570° F., but more preferably, the drying temperature will range from 190° F. to about 480° F., for a period of time generally in the range of from about 0.5 hour to about 8 hours, more preferably in the range of from about 1 hours to about 5 hours. The dried, promoted composition is then calcined in the presence of oxygen or an oxygen-containing inert gas generally at a temperature in the range of from about 700° F. to about 1400° F., and more preferably in the range of from 930° F. to 1330° F., until volatile matter is removed and the elemental metal and/or the metal-containing compounds are substantially converted to metal oxides. The time required for this calcining step will generally be in the range of from about 0.5 hour to about 4 hours, and will preferably be in the range of from about 1 hour to about 3 hours.

The metal oxide promoter will generally be present in the absorbing composition in an amount in the range of from about 0.1 weight percent to about 15 weight percent, and will more preferably be in the range of from about 2.0 weight percent to about 7.5 weight percent, most preferably in the range of from 5 to 7 weight percent.

Once the absorbent composition components are properly mixed and agglomerated, the mixture can advantageously undergo a drying step for removing certain quantities of the liquid medium of the colloidal oxide solution component of the compositions described herein. The drying of the agglomerates can be conducted at any suitable temperature for removing excess quantities of liquid; but preferably, the drying temperature will range from about 150° F. to about 550° F. More preferably, however, the drying temperature shall range from about 190° F. to about 480° F. Generally, the time period for such drying shall range from about 0.5 hour to about 8 hours and, more preferably, the drying time shall range from about 1 hour to about 5 hours. The method and apparatus used for performing the optional drying step are not critical aspects of this invention and any suitable methods and apparatuses known in the art can be used. Examples of many of the methods and apparatuses suitable for use in this invention for drying an agglomerate are described at length in *Perry's Chemical Engineers' Handbook*, pages 20–3 through 20–75 (6th edition, 1984).

Molybdenum compounds suitable for use as a source for a promoter metal are ammonium molybdate, potassium molybdate, molybdenum oxides such as molybdenum (IV) oxide and molybdenum (VI) oxide and the like and mixtures of any two or more thereof.

Tungsten compounds suitable for use as a source for a promoter metal are ammonium tungstate, potassium tungstate, tungsten oxides such as tungsten (IV) oxide and tungsten (VI) oxide and the like and mixtures of any two or more thereof.

Another embodiment of the invention includes a method for preparing a high crush strength absorption composition which avoids the problems with excessive equipment wear caused by the abrasive nature of certain absorption components, such as silica. This novel method eliminates the problems with high equipment wear by allowing the use of tumbling agglomeration methods to form agglomerates of the compositions described herein. The use of tumbling-type or disk-type agglomerators to form agglomerates is well known in the art. Description of methods and apparatuses used for performing such tumbling-type agglomeration procedures can be found in various art references, such as, for example, *Perry's Chemical Engineer's Handbook* (6th edition 1984), wherein at pages 8–65 through 8–68 such methods and apparatuses are described at length. When referred to herein, the term "agglomeration" is that process whereby small particles are gathered together into larger particles of relatively permanent masses. These permanent masses can be any suitable shape, such as irregular pellets or balls, but tumbling agglomeration methods generally provide substantially spherically shaped agglomerates. While the utilization of tumbling-type agglomerators is well known in the art, the use of certain binders to assist in the formation of agglomerates and the effects of such binders upon the mechanical properties of the final agglomerates are not always generally known by those in the art. In particular, a novel aspect of the method for preparing high crush strength absorption compositions is the use of a colloidal oxide solution as a binding agent during tumbling agglomeration of the absorbent components of the compositions described herein. The art does not teach the use of colloidal oxide solution as a suitable agent for binding the absorbent compounds of zinc oxide and silica. Furthermore, in addition to the unexpected binding properties of colloidal oxide solutions, there is also the result that the final agglomerates have unexpectedly good mechanical properties.

In one embodiment of the methods of preparing a high crush strength absorption composition, a colloidal oxide solution is sprayed, in a spraying step, onto a homogeneous mixture comprising, consisting of, or consisting essentially of, zinc oxide and silica during tumbling agglomeration of the homogeneous mixture to form an agglomerate. Any suitable method for forming a spray of the colloidal oxide solution can be used in this invention. The spray can generally be in the form of small droplets or dispersed droplets which serve to wet the homogeneous mixture during tumbling agglomeration so as to permit the formation of spheres or balls.

The ratio of zinc oxide to silica in the homogeneous mixture can range from about 0.25:1 to about 4:1. Preferably, the ratio of zinc oxide to silica in the homogeneous mixture can be in the range of from 0.5:1 to about 1.5:1; but, most preferably, the ratio can range from 0.75:1 to 1.25:1. Additionally, the homogeneous mixture can be a mixture comprising, consisting of, or consisting essentially of, zinc oxide and silica in the form of a fine powder. This homogeneous powder mixture can suitably be agglomerated by spraying of the colloidal oxide solution upon such homogeneous powder mixture while tumbling the homogeneous powder mixture within an inclined rotating disk agglomerator, which is equipped with a rim. As earlier mentioned, this tumbling agglomeration results in the formation of an agglomerate that is substantially in the shape of a sphere.

The colloidal oxide solution utilized in the method of preparing a high strength absorption composition has the same properties as the colloidal solution or sol earlier described herein. The amount of the colloidal oxide solution utilized in the agglomeration of the homogeneous mixture or the homogeneous powder mixture is to be such to provide an agglomerate, either in a dry form or a calcined form, having a content of the metal oxide compound from an amount that is effective for providing an agglomerate having a crush strength of at least 3 lbs$_f$ to about 30 weight percent of the total weight of the agglomerate. Preferably, however, the amount of colloidal oxide solution utilized in the agglomeration step should be such that the metal oxide content of either the dried agglomerate or calcined agglomerate shall range from about 5 weight percent to about 20 weight percent. Most preferably, the quantity of colloidal oxide solution utilized in the agglomeration of the composition will be such that the amount of metal oxide content in either the dried agglomerate or the calcined agglomerate shall range from 5 weight percent to 15 weight percent.

As earlier mentioned, the novel method described herein for preparing a high crush strength absorption composition gives a final agglomerate, which has been either dried or calcined, or both, having an exceedingly high crush strength of at least 3 lbs$_f$. The final agglomerate can preferably have a crush strength of from about 3 lbs$_f$ to about 6 lbs$_f$; but preferably, the crush strength can range from 3.5 lbs$_f$ to 5.5 lbs$_f$.

It has further been discovered that by adding a Group VIII metal compound promoter to a dry agglomerate prepared by the methods described herein and subsequently calcining the thus promoted agglomerate, an improvement in the crush strength of an unpromoted calcined agglomerate can be achieved. This metal oxide promoted agglomerate has substantially improved mechanical properties over that of the unpromoted agglomerate in that such a metal oxide promoted agglomerate, after having undergone a further calcining step, can have a crush strength of at least 5 $lbs_f$. Preferably, the crush strength of such metal oxide promoted absorbent composition, which has subsequently been calcined, can range from about 6 $lbs_f$ to about 14 $lbs_f$; most preferably, however, the crush strength can range from 7 $lbs_f$ to 13 $lbs_f$.

The metal oxide promoters can be added to the agglomerates produced by the methods herein by any method known in the art. One preferred method for adding a promoter to the agglomerates described herein is by the impregnation of the agglomerates by a standard incipient wetness procedure, whereby the agglomerates are impregnated by either an aqueous or an organic solution containing the desirable amount of promoter metal that has been diluted with a volume of the aqueous or organic solvent that is equal to the total pore volume of the absorbent material or the agglomerate material being impregnated. Suitable metal oxide promoters have been earlier described herein. The amount of metal oxide promoter that can be added to the agglomerate should be such that the amount in the final calcined or dried agglomerate is in the range of from about 0.1 weight percent to about 15 weight percent, and will more preferably be in the range of from about 2 weight percent to about 7.5 weight percent, most preferably, the metal oxide promoters will be in the range of from 5 to 7 weight percent. The operating conditions for drying and calcining of the agglomerates has thoroughly been described hereinabove.

As an additional embodiment of the present method for preparing a high crush strength absorption composition, a homogeneous powder mixture prepared by mixing zinc oxide and silica with water to form a mixture, undergoes a drying step to form a dried mixture, which subsequently is milled to form a homogeneous mixture. The milled homogeneous mixture can be utilized in the methods described hereinabove. Any suitable method for mixing the zinc oxide and silica components with water can be used, and it can be done in a batch-wise fashion or a continuous fashion, provided that the components are thoroughly and intimately mixed prior to further processing. Suitable types of batch mixers include, but are not limited to, change-can mixers, stationary-tank mixers, double-armed kneading mixers, having any suitable agitator or blades, such as sigma blades, dispersion blades, multi-wiping overlap blades, single curve blades, double-nabin blades and the like. Suitable types of continuous mixers can include, but are not limited to, single or double screw extruders, trough-and-screw mixers and pugmills. To achieve the desired dispersion of the materials, they are mixed until a homogeneous mixture is formed. The mixing time should be sufficient to give a uniform mixture and generally will be less than about 45 minutes. Preferably, the mixing time will be in the range of from about 2 minutes to about 15 minutes.

Following the mixing of water with the absorbent components comprising, consisting essentially of, or consisting of, zinc oxide and silica, the thus-formed mixture is dried to remove the water utilized in the mixing step. Any suitable method for drying can be used and should be such that a substantially dry mixture is formed. The operating conditions for the drying step have been earlier described herein.

The dried mixture of zinc oxide and silica can further be reduced in size preferably to the form of a homogeneous powder mixture by any suitable or known method of size reduction. There are many known methods and apparatuses for size reduction and reference is hereby made to the examples shown and described at length in *Perry's Chemical Engineer's Handbook*, (6th edition 1984), pages 8–20 to 8–48. Any of these size reduction methods and apparatuses can be used for milling purposes and for the purposes of forming a powder for subsequent use in tumbling agglomeration to form an agglomerate by the aforementioned methods of spraying a colloidal oxide solution onto such powder.

The sulfur removal processes of the present invention can be carried out by means of any apparatus whereby there is achieved an alternate contact of the absorbing composition with a sulfur-containing gaseous feed stream and, thereafter, of the absorbing composition with oxygen or an oxygen-containing gas which is utilized to regenerate the absorbing composition. The sulfur removal process is in no way limited to the use of a particular apparatus. The sulfur removal process of this invention can be carried out using a fixed bed of absorbing composition, a fluidized bed of absorbing composition, or a moving bed of absorbing composition. Presently preferred embodiment is the use of a fixed bed of absorbing composition.

In order to avoid any casual mixing of the gaseous feed stream containing sulfur compounds with the oxygen or oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid can be utilized. A presently preferred purge fluid flow rate is one which will give a gaseous hourly space velocity (GHSV) in the range of from about 800 GHSV to about 1200 GHSV. As used herein, the term "gaseous hourly space velocity" is defined as the ratio of the gaseous volumetric flow rate, at standard conditions of 60° F. and one atmosphere of pressure, to the reactor volume.

The composition of matter of this invention can be utilized to remove trace quantities of sulfur compounds from any suitable type of gaseous feed steam containing contaminating quantities of sulfur compounds. Such gaseous streams can contain sulfur compounds in the concentration range upwardly to about 2 mole percent. The sulfur compounds are generally of the type consisting of hydrogen sulfide, sulfur dioxide, carbonyl sulfide, carbon disulfide, and mixtures of two or more thereof. One preferred embodiment of the invention includes the processing of Claus plant tail gas streams. Of these Claus plant tail gas streams, they can be from either a Claus process operated in a mode for minimizing sulfur dioxide or the tail gas stream can undergo a prior hydrogenation step whereby the sulfur compounds within the tail gas stream are reduced to hydrogen sulfide. The sulfur dioxide minimization operating mode of the Claus process is conducted by providing the reaction zone with a slight excess of hydrogen sulfide above the stoichiometric requirement for the Claus reaction. This slight stoichiometric excess of hydrogen sulfide results in minimizing the amount of sulfur dioxide that is present in a Claus tail gas. If the ratio of hydrogen sulfide to sulfur dioxide in the reaction zone of a Claus plant approximates 2:1, then the ratio of hydrogen sulfide to sulfur dioxide in the Claus tail gas will also approximate 2:1. Generally, the concentration of sulfur compounds in a Claus tail gas stream will be less than 2 mole percent; the carbon dioxide will be present in the tail gas stream at a concentration in the range of from about 5 to about 60 mole percent. Water normally will be present in the range of from about 10 mole percent to about 40 mole percent, nitrogen will be present in the range of from about 20 mole percent to about 50 mole percent and hydrogen will be present in the range upwardly to about 2 mole percent.

The gaseous stream containing a concentration of sulfur compounds is contacted with the novel absorption compositions described herein to produce a treated effluent stream having a substantially reduced concentration of sulfur compounds. Preferably, the substantially reduced concentration of the sulfur compounds in the treated effluent stream can be less than 0.5 mole percent of the treated effluent stream. Most preferably, the substantially reduced concentration of sulfur compounds in the treated effluent stream can be less than 0.02 mol percent of the treated effluent stream.

Any suitable temperature for the sulfur-removal processes of the present invention can be utilized which will achieve the desired removal of sulfur from a gaseous feed stream. The temperature will generally be in the range of from about 300° F. to about 1110° F. and will, more preferably, be in the range of from about 390° F. to about 840° F.

Any suitable temperature can be utilized which will regenerate the absorbing composition from its sulfided form back to the original absorbing composition form. The regeneration temperature will generally be in the range of from about 700° F. to about 1500° F. The regeneration temperature is preferably in the range of from about 800° F. to about 1400° F. Most preferably, the regeneration temperature should range from about 800° F. to about 1300° F.

Any suitable pressure can be utilized for the processes of the present invention. The pressure of the gaseous feed stream being treated is not believed to have an important effect on the absorption process of the present invention, and will generally be in the range of from about atmospheric pressure to about 2,000 psig during the treatment.

Any suitable residence time for the sulfur-containing gaseous feed stream in the presence of the absorbing composition of the present invention can be utilized. The residence time expressed as volumes of gas at standard temperature and pressure per volume of absorbing composition per hour will generally be in the range of about 10 to about 10,000 and will, more preferably, be in the range of about 250 to about 2500.

In the preferred embodiment of the invention, the Claus plant effluent stream having a concentration of sulfur compounds can be introduced into an absorption zone containing any of the novel absorbent compositions described herein to remove at least a portion of the concentration of sulfur compounds to produce a treated effluent stream having a substantially reduced concentration of the sulfur compounds to produce a laden absorbent composition. Periodically, the laden absorbent composition can be regenerated by passing an oxygen-containing gas in contact with the laden absorbent composition to produce both a regenerated absorbent and a regeneration effluent stream. Claus processes are well known in the art and any references herein to Claus processes or Claus plants refers to those conversion processes for recovering elemental sulfur from fluid streams, sometimes referred to as acid gas streams, containing primarily hydrogen sulfide and carbon dioxide. These acid gas streams are generally fluid streams having their origin from a main gas treating system used to remove hydrogen sulfide and carbon dioxide from fluid streams containing such. The acid gas stream is charged to the thermal zone of a Claus plant wherein a portion of the hydrogen sulfide is combusted in the presence of air. In the thermal zone of the Claus plant, the hydrogen sulfide will generally react with oxygen to form sulfur dioxide and water by the following reaction equation:

$$2H_2S + 3O_2 \rightarrow 2SO_2 + 2H_2O.$$

In order to convert the sulfur compounds contained in the acid gas stream to elemental sulfur, the effluent from the Claus plant thermal zone will pass to a Claus plant sulfur recovery zone or reaction zone wherein the sulfur dioxide is reacted with the unconverted hydrogen sulfide to form elemental sulfur and water in accordance with the following equation:

$$2H_2S + SO_2 \rightarrow 3S + 2H_2O.$$

For the optimum recovery of sulfur from the hydrogen sulfide in the acid gas stream, it is most desirable to maintain a ratio of hydrogen sulfide to sulfur dioxide in the fluid stream to the Claus reactor zone of about 2:1. In order to achieve this optimum ratio, the amount of air charged to the Claus plant thermal zone will be controlled so as to react a sufficient amount of $H_2S$ with oxygen to form the necessary ratio of $SO_2$. The Claus plant effluent stream or tail gas will generally have only trace quantities of sulfur compounds which include hydrogen sulfide and sulfur dioxide. Other possible sulfur compounds contained within the tail gas stream can include carbon disulfide and carbonyl sulfide. As earlier described, the Claus process can be operated in a sulfur dioxide minimization mode or, alternatively, the tail gas can further undergo a hydrogenation step whereby sulfur compounds are reduced to hydrogen sulfide prior to downstream processing. Preferably, the concentration of sulfur compounds can be less than about 2 mole percent of the tail gas stream.

The Claus plant effluent stream or tail gas stream having a concentration of sulfur compounds is introduced into a vessel defining an absorption zone containing the novel absorbent composition described herein. Within the absorption zone, at least a portion of the concentration of the sulfur compound contained within the tail gas stream is removed to produce a treated effluent stream having a substantially reduced concentration of the sulfur compounds, but, preferably having a concentration of sulfur compounds of less than about 0.5 mol percent and, most preferably, less than about 0.1 mol percent. The removed sulfur compounds will be absorbed upon the surfaces and within the pores of the absorbent composition to produce a laden absorbent composition. The chemical changes that are believed to occur in the absorption composition during the absorption or removal step are summarized in the following equation:

$$ZnO + H_2S \rightarrow ZnS + H_2O.$$

Once the absorbent composition becomes substantially completely sulfided, it is a laden absorbent requiring a regeneration in order to restore the composition to its original form. The regeneration is conducted periodically by terminating the fluid flow to the absorption zone followed by passing an oxygen-containing gas in contact with the laden absorbent to produce a regenerated absorbent in a regeneration effluent stream. It is believed that the regeneration step occurs by the following equation:

$$ZnS + O_2 \rightarrow ZnO + SO_x.$$

The regeneration effluent stream which contains the sulfur oxide compounds can, optionally, be recycled to be mixed with the acid gas stream being charged to the Claus plant thermal zone. This regeneration effluent stream is mixed with the acid gas stream prior to introducing the acid gas stream into the Claus plant thermal zone. The benefit from recycling the regeneration effluent stream comes from the ability to use the sulfur oxide compound as a reactant with the unconverted $H_2S$ to form elemental sulfur and water in accordance with the above equations.

Figure 1:
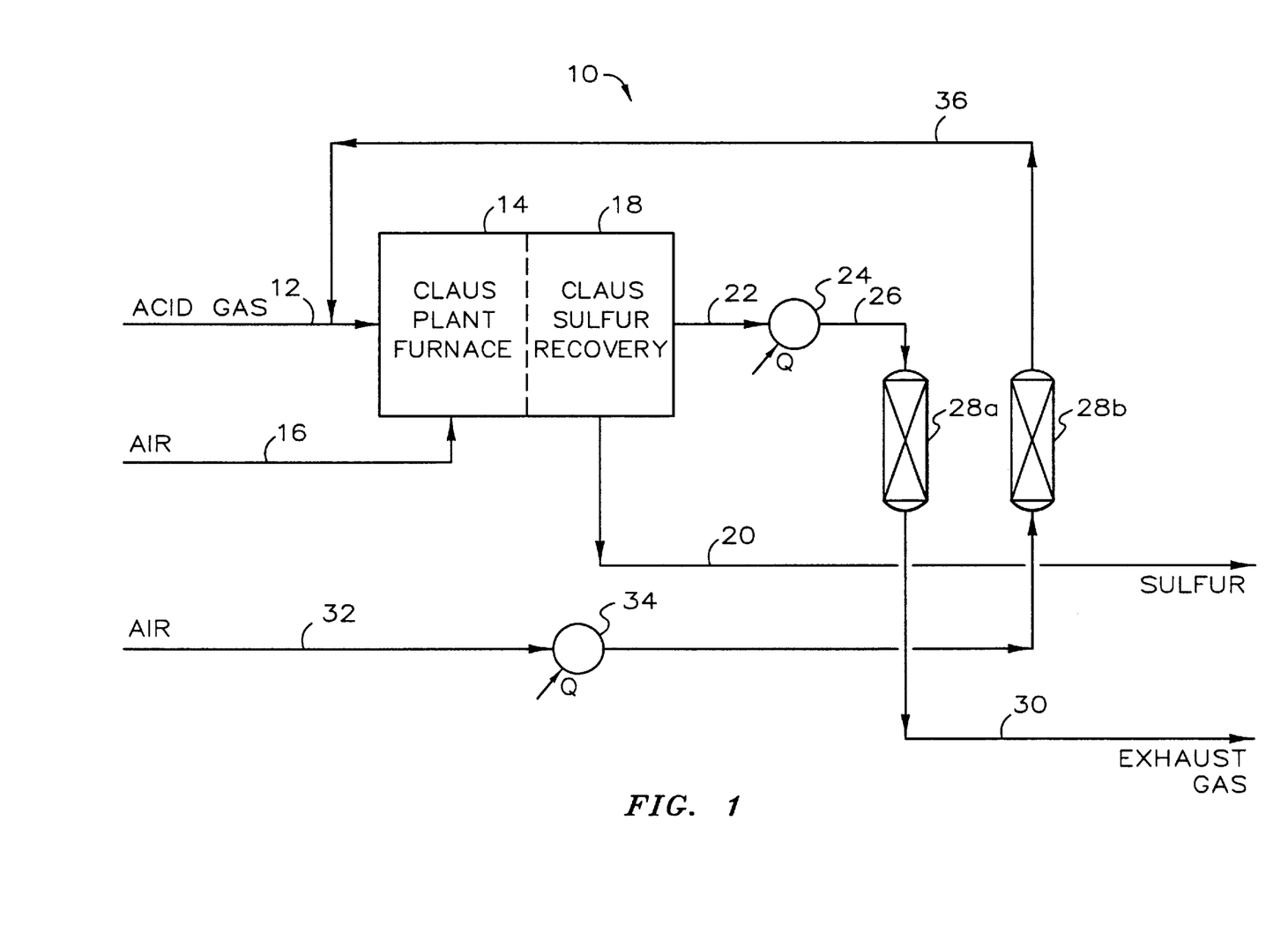
FIG. 1 is a schematic process flow diagram illustrating a preferred embodiment of the inventive process for removing sulfur compounds from contaminated fluid streams.

Referring now to FIG. 1, there is provided a schematic representation of process 10 for removing sulfur compounds from contaminated fluid streams. An acid gas stream having a concentration of hydrogen sulfide is introduced via conduit 12 to furnace 14, which defines a thermal zone of a Claus plant, wherein at least a portion of the hydrogen sulfide of the acid gas stream is combusted with oxygen that is contained within the air that is introduced into the thermal zone defined by furnace 14 via conduit 16. The resultant product from the thermal zone is introduced into reactor 18, which defines a reactor zone of the Claus plant, wherein elemental sulfur is recovered through conduit 20, and a Claus effluent stream is produced and passes by way of conduit 22 to heating means or heat exchanger 24. The Claus plant effluent stream is, optionally, heated to a desired temperature and then passes by way of conduit 26 to absorber vessels 28a and 28b, which respectively define two separate absorption zones. Contained within the absorption zones are any of the novel absorbent compositions described herein. Within the absorption zones, at least a portion of the sulfur compounds contained within the Claus plant effluent stream are absorbed by the absorbent composition or removed from the effluent stream to produce a treated effluent stream which is conveyed from absorber vessel 28a or 28b, or both, via conduit 30. The treated effluent stream will generally have a substantial reduction in the concentration of the sulfur compounds. Preferably, the amount sulfur compounds contained within the treated effluent stream will be less than about 0.5 mole percent and, most preferably, the concentration of sulfur compounds in the treated effluent stream will be less than 0.1 mole percent.

It is generally desirable to have at least two separate absorption zones in order to permit the simultaneous regeneration of one absorption zone while utilizing another absorption zone for removing or absorbing sulfur compounds from the Claus plant tail gas stream. Having at least two absorbent zones permits the periodic regeneration of a laden absorbent composition by passing an oxygen or oxygen-containing gas, such as air, in contact with the ladened absorbent to produce a regenerated absorbent and a regeneration effluent stream. The oxygen-containing gas is introduced into absorber vessel 28a or 28b, or both, via conduit 32. Optionally, disposed within conduit 32 is heating means or heat exchanger 34 which, if desired, permits the heating of the oxygen-containing gas prior to passing the gas into at least one of the absorption zones. The regeneration effluent stream passes from absorber vessel 28a or 28b, or both, through conduit 36 to be mixed with the incoming acid gas stream passing through conduit 12 prior to introducing the thus formed mixture to the thermal zone.

Figure 2:
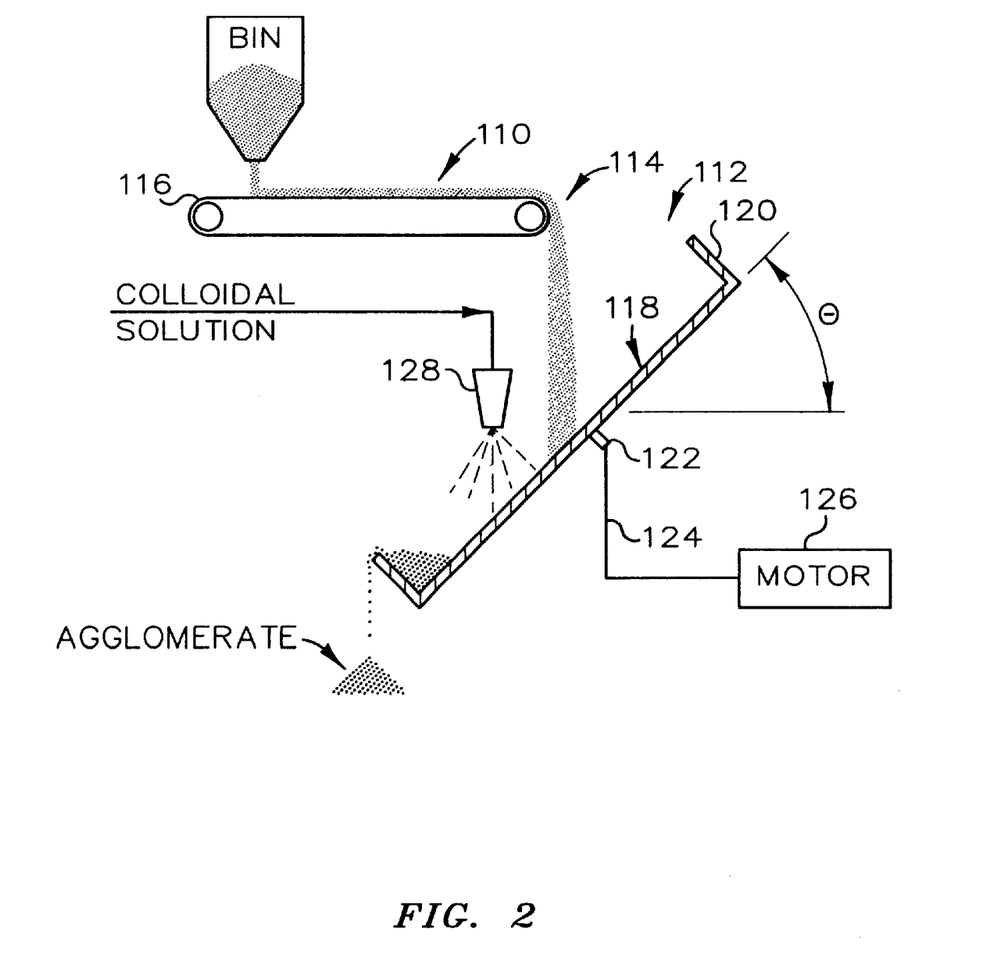
FIG. 2 is a schematic representation of the inventive method for preparation of an absorption composition illustrating certain features of the present invention.

FIG. 2 is provided to illustrate the use of a typical inclined pan or disk type agglomerator used in the method for preparing the compositions of this invention. As shown in FIG. 1, a feeder device 110 is provided so that material can be charged to pan 112 of the agglomerator. Any suitable feeder for charging material can be used. That which is shown in FIG. 2, however, is a belt type conveyor on which the agglomerate charge material 114 comprising the absorbent components is conveyed and discharged to pan 112 by a moving belt 116. Pan 112 comprises a disk 118 that is equipped with a rim 120 attached to the outer perimeter edge of disk 118 so as to form an essentially open-end, cylindrically shaped device. To promote the lifting and cascading of the material in pan 112, the inside surface of disk 118 can optionally be provided with a rough surface by any suitable means including, for example, expanded metal, abrasive coatings or metallized surfaces. Disk 118 can be any suitable diameter necessary for giving the required capacity and can range from less than one foot in diameter to more than twenty feet in diameter. The depth of pan 112 is set by the height of rim 120, which can be any suitable height that will promote the desired agglomeration. Generally, the height of rim 120 will approximate twenty percent of the diameter of disk 118.

Provided on disk 118 is rotation means 122 which permits the rotation of pan 112 about its axis. Rotation means 112 is connected by linking means 124 for transmitting power from power means 126 to rotation means 122. Power means 126 can be any suitable device for imparting the power necessary for rotating pan 112 about its axis and can include electrical motors of any type, engines of any type or turbines of any type. Preferably, however, power means 126 is an electrical motor with linking means 124 being any suitable device including those devices which can permit variable speed control of pan 112.

Pan 112 can be inclined at an angle from the horizontal plane, as depicted in FIG. 2 and as referred to in FIG. 2 by the Greek letter theta ($\theta$), in the range of from about 15° to about 75°; but, generally, the angle of inclination will range from about 30° to about 65°. The agglomerate or pellet size is significantly influenced by the angle of inclination of pan 112.

To treat and agglomerate the absorption composition, the absorbent component materials or agglomerating charge 114 is fed to pan 112. As disk 118 is rotated about its axis, the material on disk 118 undergoes a tumbling action. A colloidal oxide solution is sprayed through nozzle 128 upon the materials while disk 118 is rotating. While FIG. 2 illustrates spray nozzle 128 as the means by which the colloidal oxide solution is contacted with the agglomerate material, any suitable method known in the art for spraying or contacting a liquid onto the dry agglomerate powder can be used. The agglomerating charge is moistened by the colloidal oxide solution that assists in the formation of pellets. The tumbling action of the materials within rotating pan 112 causes what is sometimes referred to as a "snowballing" effect whereby the moistened material agglomerates as the dampened particles come into contact with other particles thereby forming spheroids. The colloidal oxide solution used in this process not only provides moisture, which causes adhesion of the particles by capillary attraction of the particle surfaces, but it also gives the unexpected result of providing a final absorption composition agglomerate having improved mechanical properties.

There are various operating factors of rotating pan 112 which affect the ultimate size of the spheroids formed. Some of these operating factors can include, but are not limited to, the rotational speed of pan 112, the angle of inclination ($\theta$) of pan 112, the location and rate of introduction of both liquid feed and solid feed and the ratio of the height of rim 120 to the diameter of disk 118. These factors, among others, are to be adjusted to provide the desired agglomerate or pellet size.

To more fully illustrate and to assist in understanding the invention, the following examples are provided.

EXAMPLE I

This calculated Example I provides calculated ranges for the various operating conditions, process flows and stream compositions in the operation of one embodiment of the herein-described invention.

TABLE I

Typical Operating Conditions, Flows and Compositions (Calculated)

| | Range |
|---|---|
| Acid Gas Feed Stream (12) Composition (mole percent on dry basis) | |
| Hydrogen Sulfide | 10–98 |
| Carbon Dioxide | 0–90 |
| Carbon Sulfide | 0–2 |
| Hydrocarbon | 0–2 |
| Air Stream | |
| Ratio of Oxygen-to-Hydrogen Sulfide | 1:1 to 2:1 preferably 0.5:1 |
| Thermal Zone (14) Operating Conditions | |
| Temperature (° C.) | 760–1260 |
| Pressure (psig) | 5–30 |
| Reaction Zone (18) Operating Conditions | |
| Temperature (° C.) | 150–400 |
| Pressure (psig) | 5–30 |
| Claus Plant Effluent Stream (22) Composition (mole percent) | |
| Sulfur Compounds | less than 2 |
| Water | 10–40 |
| Hydrogen | 0–2 |
| Nitrogen | 20–50 |
| Carbon Dioxide | 5–60 |
| Total Effluent Stream (30) Composition (mole percent) | |
| Sulfur Compounds | 0.1–0.5 |
| Regeneration Effluent Stream (36) Composition (mole percent) | |
| Sulfur Oxides | 5–25 |
| Nitrogen | 70–90 |
| Water | 1–5 |

EXAMPLE II

This Example II describes the method of preparing the absorbent compositions along with the components of such compositions and pertinent physical property data of the prepared compositions.

Spheres comprising about 38 weight percent celite silica, about 50 weight percent zinc oxide (ZnO) and about 12 weight percent alumina were prepared as follows. First, ZnO and celite powders were mixed for a period of approximately 45 minutes in a sufficient amount of water to form a mixture and then dried at a temperature of about 300° F. for 6 to 12 hours. The dried material was broken up to a fine powder in a ball mill. The resulting powder was then sprayed with a colloidal solution of Dispal® 18N4-20 alumina (Vista Chemicals) in a sufficient amount to incorporate about 5.25 weight percent alumina in the resultant mixture which was thereafter dried to form a dried powder. A portion of this dried powder was placed in a Dravo Corporation pelletizing disk or pelletizer for forming an agglomerate. While the pelletizing disk was being rotated, an additional amount of the fine powder was continuously fed to the pelletizer using a powder feed and the mixture in the disk was continuously sprayed with a colloidal solution of Dispal® alumina in water to effect sphere formation. The amounts of powder feed and colloidal alumina solution sprayed onto the powder was adjusted to yield spheres with the composition stated above. The disk angle and its revolution was manipulated to yield spheres of desired size.

The spheres were dried at about 275° F. for about 3 hours and then calcined at about 1175° F. for about two hours. The dried and calcined spheres were impregnated by use of an incipient wetness method with a sufficient amount of $Ni(NO_3)_2 \cdot 6H_2O$ dissolved in water to yield about 7.5 weight percent nickel oxide in the product. This was followed by another drying and calcination step as described above. The physical characteristics of the material before and after nickel impregnation are shown in Table II. Comparative data are also provided in Table II for a composition similar to that of the inventive composition but which was prepared by extrusion methods instead of disk agglomeration methods and which such comparative composition did not utilize a colloidal solution as a binder or binding agent. The data presented in Table II show that the spherical product has high mechanical strength while still maintaining pore volume and bulk density similar to those of the comparative composition or material.

TABLE II

Physical Properties of $H_2S$ Absorbents

| | Before Ni Impregnation | | | After Ni Impregnation |
|---|---|---|---|---|
| | Cr. Str. ($lb_F/p$) | Bulk Density (g/cc) | Water Pore Volume (cc/g) | Cr. Str. ($lb_F/p$) |
| Control Composition | | | | |
| Extrudates: (50 parts ZnO, 40 parts Celite, 10 parts $Al_2O_3$, 7.5 parts NiO) | 3 | 0.78 | 0.40 | 8 |
| Invention Spheres: | | | | |
| 3½ mesh | 4 | 0.75 | 0.38 | 13 |
| 4–5 mesh | 5 | 0.74 | 0.43 | 11 |
| 5–14 mesh | 4 | 0.74 | 0.42 | 7 |

This Example III describes the use of the novel material in a process for removing $H_2S$ from a $H_2S$-contaminated fluid stream and makes a comparison between the novel material and a control material when both are utilized in an $H_2S$ absorption process.

The novel absorbent described in Example II above was subjected to an absorption test in which the absorbent was alternately contacted with a gaseous stream containing $H_2S$ mixed with an inert gas until the sulfur loading capacity of the absorbent was reached followed then by a regeneration of the sulfur-loaded absorbent to its original ZnO form by contacting the absorbent with air. The reactor temperature for the contacting step was maintained at about 800° F. and the regeneration temperature was maintained at about 1100° F. The sulfur loading capacity of the absorbent was determined to be reached when hydrogen sulfide was detected in the effluent stream; at which point, the sulfided material was regenerated in air. The $SO_2$ concentration was measured at 10 minutes after the start of the absorption step and at breakthrough (BT). The test data for the inventive composition is included in Table III. The absorbent of this invention exhibited similar sulfur removal ability to that of the control material while exhibiting much improved mechanical strength as demonstrated in Example II above. Even after 100 absorbing and regeneration cycles, only a minor loss in sulfur removal capacity was noted. The spherical shape of this product is preferred for commercial operation for a number of reasons including the improved pressure drop characteristics that result from the use of spherical absorbent masses.

TABLE III

Hydrogen Sulfide Absorption Test Results

| Sample | Composition (weight parts) ZnO/Celite/A1203/NO | Cycle Number | 10 min. | BT | Sulfur Loading (Wt %) |
|---|---|---|---|---|---|
| A (Control) | 50/40/10/7.5 | 1 | 180 | 60 | 10.6 |
|  |  | 14 |  |  | 13.2 |
|  |  | 20 | 950 | 630 | 13.1 |
| Invention | 50/38/12/7.5 | 1 | 30 |  | 11.3 |
|  |  | 2 | 715 | 470 | 12.4 |
|  |  | 15 | 805 | 530 | 12.4 |
|  |  | 20 | 845 | 555 | 12.7 |
|  |  | 100 |  | 470 | 11.0 |

BT = Breakthrough

It is understood that the foregoing detailed description is given merely by way of illustration and that many variations may be made herein without departing from the spirit of this invention.

That which is claimed is:

1. A process of making a high crush strength absorption composition for absorbing hydrogen sulfide from a fluid stream, said process comprising:

(a) mixing zinc oxide and silica to provide a dry homogeneous mixture;

(b) providing said dry homogeneous mixture within a pan of a tumbling agglomerator;

(c) spraying a colloidal oxide solution, wherein said colloidal oxide solution comprises particles of an oxide compound dispersed in a liquid medium, wherein said oxide compound comprises colloidal-size particles having a median particle size in a range from about 50 angstroms to about 10,000 angstroms, upon said dry homogeneous mixture while rotating said pan to thereby form pellets; and (d) drying said pellets to provide dried pellets having a crush strength of at least about 5 $lb_f$.

2. A process as recited in claim 1 wherein the ratio of zinc oxide to silica in said dry homogeneous mixture is in the range of from about 0.25:1 to about 4:1 and wherein the amount of colloidal oxide present in said pellets is such that the oxide content of said pellets is in the range of from an amount effective for providing said dried pellets with a crush strength of at least about 5 $lb_f$ to about 30 weight percent.

3. A process as recited in claim 1 wherein said colloidal-size particles in said colloidal oxide solution are in the range of from about 1 weight percent to about 30 weight percent.

4. A process as recited in claim 3 wherein said oxide compound is selected from the group consisting of alumina, silica, titania, zirconia, tin oxide, antimony oxide, cesium oxide, yttrium oxide, copper oxide, iron oxide, manganese oxide, molybdenum oxide, tungsten oxide, chromium oxide and mixtures of any two or more thereof.

5. A process as recited in claim 4 wherein said dried pellets further comprise a Group VIII metal oxide.

6. A process as recited in claim 5 wherein said Group VIII metal oxide is present in said dried pellets in the range of from about 0.1 weight percent to about 15 weight percent.

7. A process as recited in claim 6 wherein said Group VIII metal oxide is nickel oxide.

8. A process of making a high crush strength absorption composition for absorbing hydrogen sulfide from a fluid stream, said process comprising:

(a) mixing zinc oxide and silica to provide a dry homogeneous mixture;

(b) providing said dry homogeneous mixture within a pan of a tumbling agglomerator;

(c) spraying a colloidal oxide solution, wherein said colloidal oxide solution comprises particles of an oxide compound dispersed in a liquid medium, wherein said oxide compound comprises colloidal-size particles having a median particle size in a range from about 50 angstroms to about 10,000 angstroms, upon said dry homogeneous mixture while rotating said pan to thereby form pellets;

(d) drying said pellets to provide dried pellets having a crush strength of at least about 5 $lb_f$; and (e) calcining said dried pellets to provide calcined pellets having a crush strength of at least about 5 $lb_f$.

9. A process as recited in claim 8 wherein the ratio of zinc oxide to silica in said dry homogeneous mixture is in the range of from about 0.25:1 to about 4:1 and wherein the amount of colloidal oxide present in said pellets is such that the oxide content of said pellets is in the range of from an amount effective for providing said calcined pellets with a crush strength of at least about 5 $lb_f$ to about 30 weight percent.

10. A process as recited in claim 8 wherein said colloidal-size particles in said colloidal oxide solution are in the range of from about 1 weight percent to about 30 weight percent.

11. A process as recited in claim 10 wherein said oxide compound is selected from the group consisting of alumina, silica, titania, zirconia, tin oxide, antimony oxide, cesium oxide, yttrium oxide, copper oxide, iron oxide, manganese oxide, molybdenum oxide, tungsten oxide, chromium oxide and mixtures of any two or more thereof.

12. A process as recited in claim 11 wherein said calcined pellets further comprise a Group VIII metal oxide.

13. A process as recited in claim 12 wherein said Group VIII metal oxide is present in said calcined pellets in the range of from about 0.1 weight percent to about 15 weight percent.

14. A process as recited in claim 13 wherein said Group VIII metal oxide is nickel oxide.

* * * * *